United States Patent [19]

Tan

[11] 4,066,486
[45] Jan. 3, 1978

[54] CABLE PRESSURE BLOCK FORMING KIT AND VALVE APPARATUS

[75] Inventor: Gene S. T. Tan, Westlake Village, Calif.

[73] Assignee: Hexcel Corporation, Dublin, Calif.

[21] Appl. No.: 693,618

[22] Filed: June 7, 1976

[51] Int. Cl.² .................... H01B 17/38; H02G 15/00
[52] U.S. Cl. ......................................... 156/48; 141/2; 141/18; 156/145; 174/23 R; 174/135; 222/483
[58] Field of Search ................. 174/23 R, 23 C, 135, 174/20, 22 R, 22 C; 222/483, 481.5, 547; 141/2, 18; 156/48, 145, 286

[56] References Cited

U.S. PATENT DOCUMENTS

| 2,024,144 | 12/1935 | Chase | 156/48 |
| 3,248,472 | 4/1966 | Montesano | 174/23 |
| 3,252,834 | 5/1966 | Vincent | 156/48 |
| 3,797,704 | 3/1974 | Dykes | 222/483 |
| 3,823,250 | 7/1974 | Monsy et al. | 174/23 R |

*Primary Examiner*—William A. Powell
*Assistant Examiner*—M. G. Wityshyn

*Attorney, Agent, or Firm*—Townsend and Townsend

[57] ABSTRACT

A kit for use in forming pressure blocks in a cable including a fluid injector with a pressurizing plunger providing a discrete amount of pressure block forming material, such as self-setting plastic, a tap fitting with a fluid inlet port providing access to the interior of the cable, and a valve comprising a housing and a closure member movably mounted to the housing, the closure member including first, second, and third sections. The first valve section includes means establishing free fluid communication between the injector and the fluid port, the second section including means sealing the passage portions from one another and from the exterior, and the third section including means communicating the fluid injector to the exterior. The valve prevents creation of a vacuum internal of the fluid injector which hinders the withdrawal of the plunger in the fluid injector while coupled to the tap fitting. The valve also blocks just injected fluid material maintaining it within the cable and under pressure, which permits the subsequent injection of additional fluid material without loss of pressure interior of the cable.

21 Claims, 4 Drawing Figures

U.S. Patent     Jan. 3, 1978     4,066,486
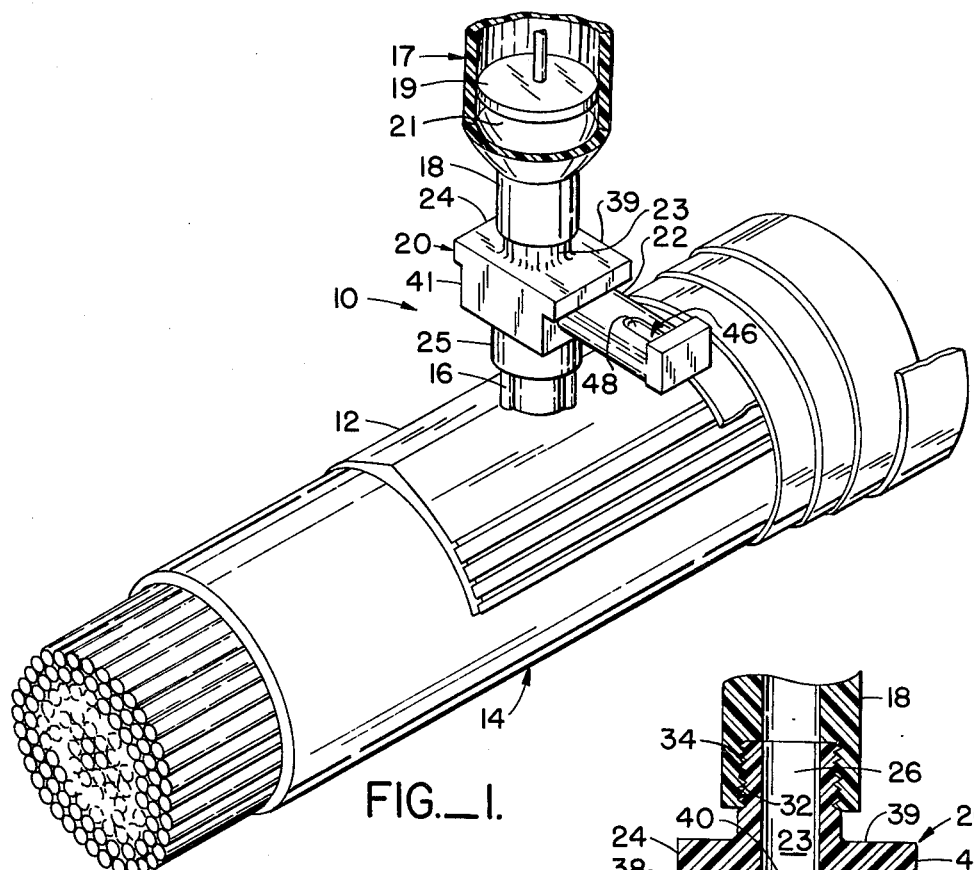
FIG._1.
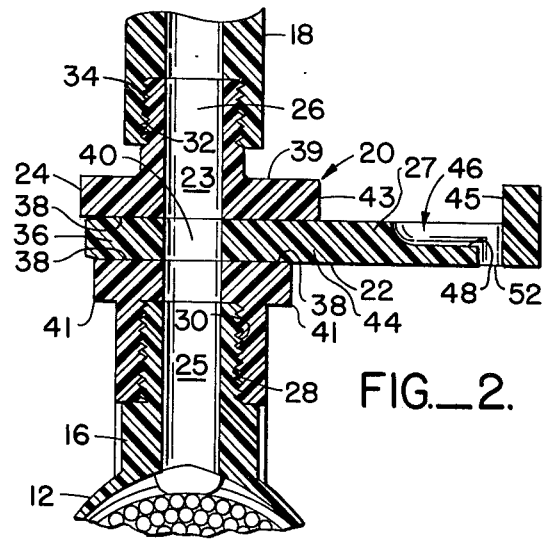
FIG._2.
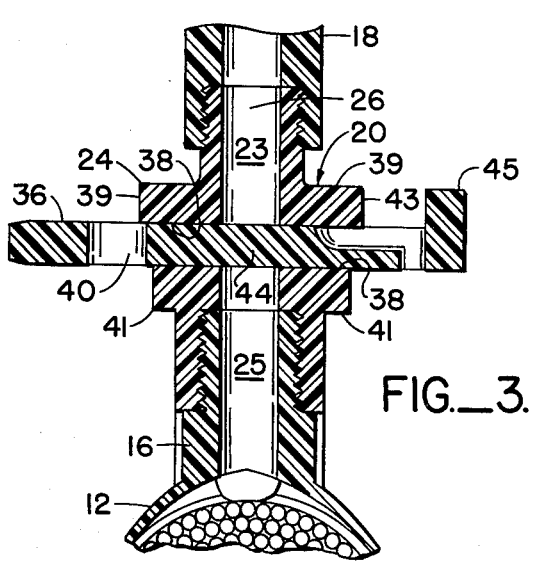
FIG._3.
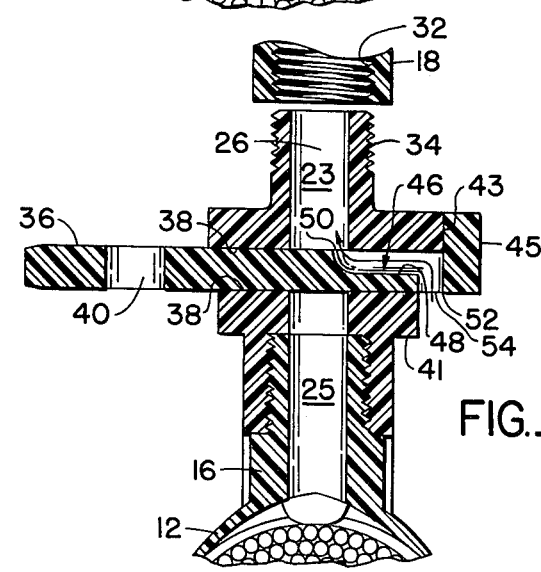
FIG._4.

CABLE PRESSURE BLOCK FORMING KIT AND VALVE APPARATUS

BACKGROUND OF THE INVENTION

This invention generally relates to the formation of gas tight pressure blocks in multiple wire or conductor electric cables such as telephone cables to enable air pressurization of sections of such cables. In particular, this invention is useful in maintaining fluid pressure in the pressure block forming compound during multiple injections at a single site on a cable during in-field service or installation.

U.S. Pat. No. 3,823,250, the disclosure of which is incorporated herein by reference, discloses a tap fitting suitable for use with the valve hereinafter described. Briefly, the tap fitting comprises a curved base sheet for placement over an opening cut in the sheath of the cable and an injection port integrally formed with and projecting from the sheet, the port including means for forming a pressure tight covering, such as threads about the mouth of the port.

As is well known in the art, air pressurization of sections of electric and telephone cables prevents the seepage of water or moisture into the cable and the resulting noise and interference in communication and power circuits. Pressure blocks forming dams at intermittent points over the length of the cables are provided by injecting a self-setting liquid compound which hardens and fills the space around the wires over a sufficient length to hold the air pressure. To form such a pressure block it is necessary to make an opening in the cable sheathing leading to the interior and then to provide and exteriorly positioned fitting through which the liquid block forming compound may be injected. To accomplish this, a fluid injector is used. Typically the fluid injector comprises a chamber containing a discrete amount of block forming compound, a pressurizing plunger operative in the chamber, and a nozzle in fluid communication with the chamber through which the fluid is ejected in response to the compression movement of the plunger operating on the compound. The fluid compound is injected into the interior of the cable by threading the nozzle of the fluid injector to the tap fitting and compressing the plunger.

Where a large amount of compound is needed to fill the cable interior to the desired extent, i.e., more than the amount normally contained within the injector chamber, the continuous injection operation must be interrupted so that the injector chamber can be refilled or recharged. To recharge the fluid injector in the midst of the injection operation, the pressure on the plunger of the fluid injector is released and the plunger is withdrawn to permit access to the injector chamber for refilling with the compound.

Recharging in the midst of the cable filling for block forming operation presents a number of drawbacks. Due to residual pressure in the cable, some of the liquid compound escapes through the tap fitting and pressure interior of the cable is normally lost. To overcome these problems, stop valves have been devised to be interposed between the fluid injector and the cable interior. Such stop valves permit injection of fluid through a fitting into the cable interior while opposing the escape of the pressurized fluid compound therefrom. The 3M Company of Minneapolis, Minn., for example, markets a resin pressure splicing system under the trademark "SCOTCHCAST Brand R.P.S." The 3M system includes a one-way valve that opens to permit the injection of the blocking compound and closes under the residual back pressure to prevent the escape of the blocking compound.

Such prior art valves have considerable drawbacks, particularly where the nozzle of the fluid injector is adapted to sealably couple with a conduit (which includes the valve) into the cable interior. For example, due to the pressure seal between the injection nozzle and the valve, it is difficult to release the plunger of the fluid injector, since any attempt to do so creates a vacuum in the interior of the fluid injector. This makes it difficult to recharge the fluid injector while it is in place on the tap fitting.

SUMMARY OF THE INVENTION

According to the invention a system is provided for use in forming pressure blocks in the cable, which may be provided as a kit capable of field assembly and including a fluid injector having a container for a discrete amount of pressure block forming material, such as self-setting plastic, an injector nozzle and a pressurizing plunger which is operative to compress and eject fluid within the container. The kit further includes a tap fitting with a fluid inlet port providing access to the interior of the cable, and a valve comprising a housing and a closure member movably mounted to the housing, the closure member including first, second, and third sections. The first valve section includes aperture means establishing free fluid communication between the injector and the fluid port; the second section includes means sealing the passage portions from one another from the exterior; and the third section includes means communicating the fluid injector to the valve exterior. The valve prevents creation of a vaccum within the fluid injector which hinders the displacement of the plunger while the fluid injector is sealably coupled to the tap fitting. Further, the valve also maintains just-injected fluid material within the cable and under pressure, which permits subsequent injection of additional fluid material without loss of already injected material or internal pressure.

The preferred embodiment of the valve comprises a housing with a translatable slide therein. The valve is opened by aligning passages in the valve housing with an aperture in the slide in a first position to permit the filling compound to flow from the fluid injector through the tap fitting into the cable. The slide is closed by translating it to a second position sealing the injector side of the valve and the cable side of the valve from one another and from the housing exterior. The valve slide may be advanced to a third position which couples the injector side with the housing exterior through a passage in the slide while maintaining a seal on the cable side of the valve. In this third position, a fluid path established in the valve slide provides fluid communication between the valves injector side and an exterior port which is preferably directed downwardly away from the injector side and thereby from the operator.

The preferred valve embodiment is intended for use with a fluid injector as hereinabove described having a nozzle adapted to sealingly attach to the valve housing. The valve is specifically contemplated for use with a tap fitting described in the above-mentioned U.S. Pat. No. 3,823,250, which tap fitting is adapted to sealably attach to the valve housing at the fluid passage opposite the fluid injector. Nevertheless, the valve may also be formed integrally with the tap fitting and may be used in the other commercially available tap fittings.

This invention has a number of advantages over the known prior art. For example, the valve, in its respective first, second and third positions, respectively, provides clear access for fluid from the fluid injector into the interior of a cable being serviced, securely seals the cable interior against the unwanted escape of fluid and loss of pressure interior of the cable, and while maintaining this seal also provides fluid communication between the atmosphere and the interior of the fluid injector. This fluid communication prevents the formation of a vacuum within the fluid injector when the plunger is withdrawn and this enables the rapid withdrawal and refilling of the fluid injector for the injection of additional fluid material into the cable interior.

Another important advantage of the valve according to the present invention is the ability to prevent escape of fluid during the subsequent filling operation. For example, with the valve initially in the second position the fluid injector can be charged with fresh material which does not escape through the valve. The injector plunger may thereafter be further advanced to pressurize the reservoir of injectable fluid, e.g., to the same level of pressurization as within the cable interior. Thereafter the valve slide may be advanced to the first position thereby establishing the desired fluid communication with the cable interior without loss of pressurization or the unwanted loss of fluid.

These and other advantages will be clearer upon reference to the following detailed description in conjunction with the accompanying figures.

BRIEF DESCRIPTION OF THE DRAWINGS

FIG. 1 is a perspective view of a plastic sheath covered multi-wire cable provided with apparatus for constructing a pressure lock including a slide valve in accordance with the present invention;

FIG. 2 is a plan view of the slide valve constructed in accordance with the present invention shown in a fully open position;

FIG. 3 is a plan view of the valve of FIG. 2 shown in a fully closed position; and FIG. 4 is a plan view of the valve of FIG. 2 in a closed position permitting inlet port pressure relief.

DETAILED DESCRIPTION OF THE PREFERRED EMBODIMENTS

Referring to the drawings, particularly FIG. 1, which shows the invention assembled in use, there is shown a tap fitting 10 having a curved based sheet 12 for placement in or over an opening in the sheath of a cable 14 for constructing a pressure lock within the cable 14. The tap fitting 10 includes an injection port 16 projecting outwardly through the sheet 12, for providing fluid communication between the exterior and interior of the cable 14.

A fluid injector 17 includes a nozzle 18 and a piston or plunger 19 disposed within a cartridge or chamber 21. The plunger 19 is operative to be axially displaceable to compress the chamber 21 in order to expel fluids within the chamber 21 through the nozzle 18.

A valve 20 is interposed between the injection port 16 and the nozzle 18. The valve 20 comprises a housing 24 having a fluid passage 26 (FIG. 2) for providing fluid communication therethrough. The housing further defines a hole or closed channel 38 transverse through the passage 26 dividing the passage 26 into an upstream portion 23 and a downstream portion 25.

The housing 24 is seen to include internal threads 28 for sealably engaging external threads 30 of the port 16. In an alternative embodiment, the housing 24 may be integral with the port 16 and base sheet 12. The inlet to the upstream portion 21 of the valve housing 24 includes male threads 34 which are adapted to engage female threads 32 within the end of the nozzle 18. In this manner, a sealed, relatively rigid structural unit is formed which comprises the nozzle 18, the valve housing 24, and the injection port 16 to establish and provide fluid communication between the fluid injector 17 and the interior of the cable 14.

The interior channel 38 is defined in a central section of the valve housing 24 characterized by an upstream flange 39 extending laterally from the passage 26 a greater dimension than the outside diameter of the upstream portion 23. The flange 39 includes an end face 43. In addition, the central section of the valve housing 24 includes a downstream flange 41 shorter than the upstream flange 39 adjacent the face 43.

Disposed within the channel 38 and sealably confronting the walls thereof is a movable member or slide 36 which serves as a valve gate dividing the passage 26 into the upstream portion 23 and the downstream portion 25. The slide 36 is preferably a straight bar having a generally flat lower face 22 and an upper face 27. The slide 36 is characterized by first, second and third principal sections 40, 44, and 46 which may be disposed in first, second and third prinicipal positions as illustrated in FIGS. 2, 3 and 4, respectively. With particular reference to FIG. 2, the first section 40 comprises an orifice mating the upstream portion 23 and the downstream portion 25 establishing free fluid communication therebetween. The second section 44 is characterized as an imperforate section of the bar 36, pressure-tight but slidable in the channel 38.

The third section 46 is distinguished by a trough 48 longitudinally disposed in the upper face 27 and terminating at a hole 52 through the slide 36. The hole 52 is adjacent a lip 45 which extends transverse of the slide 36 and conforms to the face 43.

Referring to FIG. 4, the third section 46 is shown in the third operational position of the valve 36. As can be seen, in this position, one end of the trough 48 connects to the upstream portion 23, while the other end connects to the hole 52 which is open to the exterior of the housing, i.e., the atmosphere, thereby to establish a vent 50 to the atmosphere.

In the third position, illustrated by FIG. 4 wherein the lip 45 confronts the face 43, a vent outlet port 54 is established which faces away from the user, e.g., downwardly toward the cable 14 adjacent the downstream flange 41.

Turning now to the operation and use of the unit including the valve, reference is further made to FIGS. 1 and 2. With the fluid injector 17 coupled to the valve 20 and the valve slide 36 in its first position as illustrated by FIG. 2, and with an amount of the pressure block forming compound within the chamber 21, the apparatus is ready for use. The plunger 19 is axially displaced to compress and pressurize the block forming compound in the container, discharging it through the nozzle 18, thereafter flowing it through the passage 26 and injection port 16 into the interior of the cable 14. When the supply of the injectable material is exhausted, the slide 36 of the valve 20 is advanced to its second position, as illustrated by FIG. 3. In this second position, the upstream portion 23 and the downstream portion 25 are sealed from each other and from the atmosphere. In this position the plunger 19 is relieved of any tension thereon maintaining compression on the fluid in the upstream portion 23.

The slide 36 is thereafter advanced to its third position, as illustrated by FIG. 4, wherein the vent 52 establishes a fluid communication path between the upstream portion 23 and the exterior atmosphere. The plunger 19 thereupon displaced to expand the volume of the chamber 21 without creating a vacuum therein, while the interior of the cable 14 is maintained under pressure. The nozzle 18 is then readily removed from the valve 20 without danger of relieving pressure within the cable 14. However, where additional fluid is required to fill the cable 14, the nozzle 18 is normally maintained in place with the slide 36 of the valve 20 at position two to prevent back flow of fluid and the plunger 19 removed from the chamber so that the container 21 can be filled with additional pressure block forming compound from a suitable supply package.

Once the container 21 has been charged, filling upstream portion 23, the plunger 19 may be advanced to compress the fluid compound in the upstream portion 23. Thereafter the slide is displaced to the first position (FIG. 1) opening the orifice 40 to establish free fluid communication between the injector 17 and the interior of the cable 14. Fluid compound from the container 21 is then injected into the cable in sufficient quantity to establish the desired pressure block.

After completion of the above injection operation, the slide 36 is again advanced through its positions two and three so that the fluid injector 17 can be separated from the valve 20 for subsequent use at another site or on another cable.

The invention is preferably provided as a kit capable of assembly in the field for use in installation and servicing of pressurized cables. The kit generally comprises the valve, the tap fitting, the fluid injector, sealing compound, containers for storing the sealing compound, and other materials such as sealing tape, spacer pins and the like. Suitable materials from which the valve and the fluid injector are formed are brass and polymer plastics such as polypropylene. Sealing compounds particularly suited for use in pressure block forming kits are on the market from the Rezolin Division of Hexcel Corporation of Chatsworth, Calfornia, and are sold under the trademarks 170 and 170LT as well as 164 and 164LT.

The present invention has been described with reference to specific embodiments. It is not intended that the scope of the invention be limited except as indicated by the appended claims.

I claim:

1. In apparatus for forming pressure blocks in a cable defined by a cable core in an interior space of a core-surrounding outer sheath, the apparatus having a pressure tap fitting defined by a base sheet for placement over an opening in the cable sheath and an injection port projecting from the sheet, injection means including a pressure applying member for flowing a fluid material under pressure through the port into the interior space to thereby form a pressure tight block in the cable, and valve means between the injection means and the injection port, the improvement to the valve means comprising: a housing including a passage therethrough for connection to the injection means and the port, and a closure member movably mountable in three positions to the housing and dividing the passage into an upstream portion communicating with the injection means and a downstream portion communicating with the port, the closure member including first, second and third sections respectively corresponding to the three positions, the first section of the closure member including means establishing a free fluid communication path between the passage portions, the second section including pressure tight means sealing the passage portions from each other, and the third section including means communicating the upstream portion with the exterior of the housing and means sealing the downstream portion from the upstream portion and the housing exterior; whereby fluid material under pressure can be retained in the interior space of the cable core while the upstream portion of the passage is vented to the exterior to facilitate the removal of the pressure applying member and the refilling of the injection means with fluid material without uncoupling the injection means and the injection port for the subsequent injection of additional fluid material under pressure into the interior space.

2. Apparatus according to claim 1 including means for linearly moving the closure member.

3. Apparatus according to claim 1 wherein the closure member is a flat slide, wherein the housing includes means positioning the slide so that it intercepts the passage, and further including means for linearly moving the slide across the passage.

4. Apparatus according to claim 3 wherein the means communicating the upstream portion of the passage with the exterior comprises a conduit means in the slide having a first terminus in fluid communication with the upstream portion of the passage and a second terminus in fluid communication with the exterior of the housing.

5. Apparatus according to claim 4 wherein the second terminus in fluid communication with the exterior of the housing is directed downwardly away from the upstream portion of the passage.

6. Apparatus according to claim 4 wherein the flat slide comprises a straight bar with opposed upstream and downstream faces for slidably abutting the interior of said housing along a track traverse of said passage and wherein said conduit means in said slide comprises a trough longitudinally extending in the upstream face of said slide, said trough including a first end and a second end, said first end being disposed for confronting the upstream portion of said passage to thereby define said first conduit terminus.

7. Apparatus according to claim 6, wherein the slide further comprises means defining an aperture through said slide transverse of said trough and in fluid communication with said trough, said aperture defining said second terminus.

8. A valve means for coupling a fluid injector and a tap fitting providing fluid access to a cable interior, the valve means comprising:
a housing defining a fluid passage therethrough and a channel across said fluid passage dividing said passage into an inlet segment and an outlet segment; and
a slide movable in said channel for sealing said passage from the housing exterior;
said slide including first, second and third sections slidably disposable between said inlet segment and said outlet segment;

the first slide section including means forming an orifice establishing free fluid communication between said inlet and said outlet segments and means sealing said orifice from the housing exterior;

the second slide section including means blocking said inlet and outlet segments;

the third section including means establishing fluid communication between said inlet segment and the housing exterior while blocking the outlet segment, whereby the inlet segment is vented to the atmosphere.

9. Apparatus according to claim 8 wherein the slide comprises a straight flat bar with opposed upstream and downstream faces for slidably and sealably engaging said housing channel, and wherein the means establishing fluid communication between said upstream segment and the housing exterior comprises a conduit means in said slide having a first terminus in an upstream face of said slide for confronting the upstream segment of said passage and a second terminus in fluid communication with the exterior of the housing.

10. Apparatus according to claim 9 wherein said conduit means comprises a groove longitudinally extending in the upstream face of said third slide section, said groove including a first end a second end, said first end being disposed for confronting the upstream segment of said passage to thereby define said first conduit terminus.

11. Apparatus according to claim 10, wherein the slide further comprises means defining an aperture through said slide transverse said groove and in fluid communication with said groove, said aperture defining said second terminus.

12. Apparatus according to claim 9 including means connected with the slide for manually moving the slide in opposing directions.

13. Apparatus according to claim 12, wherein said manual moving means comprises a tab at one end of the slide disposed to abut an opposing face on the exterior of the housing.

14. Apparatus according to claim 8 wherein the housing is integrally constructed with the tap fitting.

15. Apparatus according to claim 1 including means for demountably securing the housing to the tap fitting.

16. A kit of component parts capable of field assembly for forming pressure blocks in a cable defined by a cable core in an interior space of a core-surrounded outer sheath, the kit comprising:

a pressure tap fitting defined by a base sheet and means defining an injection port projecting from one side of the base sheet and communicating the one side with another side of the sheet;

fluid injection means including a pressure applying member for flowing a fluid material under pressure through the port into the cable interior space to thereby form a pressure block therein;

valve means comprising a housing including a passage therethrough for connection to and fluidly communicating the injection means and the injection port, and a closure member movably mounted to the housing and dividing the passage into an upstream portion communicating with the injection means and a downstream portion communicating with the port, the closure member including first, second, and third sections, the first section including means establishing free fluid communication between the passage portions, the second section including pressure tight means sealing the passage portions from each other, the third section including means communicating the passage upstream portion with the exterior of the housing and sealing the downstream passage portion from the upstream passage portion and from the housing exterior.

17. A kit according to claim 16 wherein said fluid injection means includes a refillable chamber for containing injectable material.

18. A kit according to claim 17 further including a reservoir for storage of injectable material and for transferring said material to said chamber.

19. A kit according to claim 16 wherein the valve housing is integrally constructed with the injection port.

20. A kit according to claim 16 including means for demountably securing the valve housing to the injection port.

21. A method for forming a pressure block in an interior space of a cable having an outer cable sheath comprising the steps of mounting a pressure tap fitting to the cable, the fitting having a port communicating the cable interior with the exterior; providing a fluid material-injecting cartridge including a cartridge housing, a pressure-applying plunger disposed interiorly of the housing and a nozzle for the discharge of pressurized material from the housing interior; placing a curable fluid material into the housing interior; laterally displacing a barrier having a first interior passage and a second passage so as to align said first interior passage with both said port and nozzle; thereafter advancing the plunger to thereby inject the material in the cartridge through the first passage into the cable interior; thereafter laterally displacing the barrier to seal the cable interior from the housing interior and to form vacuum-breaking fluid communication between the nozzle and the housing exterior through the second passage such that fluid pressure across the plunger remains substantially equalized; and withdrawing the plunger from the housing.

* * * * *